(12) United States Patent
Roy-Martinache et al.

(10) Patent No.: US 7,695,270 B2
(45) Date of Patent: Apr. 13, 2010

(54) MOULD FOR THE INJECTION MOULDING OF A PLASTIC PIECE AND MOULDING METHOD

(75) Inventors: Annabelle Roy-Martinache, Cergy Pontoise (FR); Alain Di Rienzo, Asnieres sur Oise (FR)

(73) Assignee: Faurecia Interieur Industrie, Nanterre (FR)

( * ) Notice: Subject to any disclaimer, the term of this patent is extended or adjusted under 35 U.S.C. 154(b) by 65 days.

(21) Appl. No.: 11/660,452

(22) PCT Filed: Aug. 18, 2005

(86) PCT No.: PCT/FR2005/002112

§ 371 (c)(1),
(2), (4) Date: Apr. 16, 2007

(87) PCT Pub. No.: WO2006/021697

PCT Pub. Date: Mar. 2, 2006

(65) Prior Publication Data

US 2007/0292637 A1 Dec. 20, 2007

(30) Foreign Application Priority Data

Aug. 18, 2004 (FR) .................................. 04 08963

(51) Int. Cl.
*B29C 45/16* (2006.01)

(52) U.S. Cl. .................... 425/441; 425/443; 425/451.5; 425/451.9; 425/330; 425/130

(58) Field of Classification Search .................. 425/112, 425/116, 117, 119, 121, 441, 442, 443, 451.5, 425/451.9, 120, 125, 130, 330, 450.1, 451.7, 425/DIG. 59, DIG. 129, DIG. 221, DIG. 247, 425/436 R, 132, 134
See application file for complete search history.

(56) References Cited

U.S. PATENT DOCUMENTS 3,718,420 A * 2/1973 Florjancic ................... 425/441

(Continued)

FOREIGN PATENT DOCUMENTS

DE         10131142 A1 *  1/2003

(Continued)

*Primary Examiner*—Eric Hug
*Assistant Examiner*—Seyed Masoud Malekzadeh
(74) *Attorney, Agent, or Firm*—Young & Thompson

(57) ABSTRACT

A mould is provided for the injection molding of a plastic piece that includes at least two adjacent parts of two compatible plastic materials, assembled to one another by welding or gluing, of different types and/or colors. The mould includes a mould cavity defined by at least two non-planar walls and at least one retractable wall movable between extended and retracted positions, dividing the mould cavity into at least two compartments supplied separately with plastic. When extended, a non-linear edge of the retractable wall cooperates with a wall of the mould cavity in a play-free manner. The retractable wall includes panels joined in at least the extended or retracted position, movable in relation to one another so they can modify the shape of the non-linear edge of the retractable wall to adapt it to the shape of a second wall of the cavity in the retracted position.

7 Claims, 4 Drawing Sheets

U.S. PATENT DOCUMENTS

| | | | | |
|---|---|---|---|---|
| 3,768,952 | A | * | 10/1973 | Connolly ................ 425/451.5 |
| 3,853,451 | A | * | 12/1974 | Bendzick .................... 425/438 |
| 3,856,256 | A | * | 12/1974 | Celesti ...................... 249/66.1 |
| 3,930,780 | A | * | 1/1976 | Lovejoy ..................... 425/556 |
| 3,947,210 | A | * | 3/1976 | Levites ....................... 425/441 |
| 4,005,967 | A | * | 2/1977 | Ayres et al. .............. 425/326.1 |
| 4,136,150 | A | * | 1/1979 | Darnall, Jr. ................. 264/318 |
| 4,206,799 | A | * | 6/1980 | McDonald .................. 164/341 |
| 4,257,994 | A | * | 3/1981 | Leblanc et al. ............. 264/102 |
| 4,268,237 | A | * | 5/1981 | Wolters ...................... 425/116 |
| 4,502,660 | A | * | 3/1985 | Luther et al. ............... 249/144 |
| 4,580,962 | A | * | 4/1986 | Haas .......................... 425/111 |
| 4,676,731 | A | * | 6/1987 | Grannen, III .............. 425/570 |
| 4,678,158 | A | * | 7/1987 | Brock ......................... 249/161 |
| 4,682,943 | A | * | 7/1987 | Schomblond .............. 425/130 |
| 4,711,621 | A | * | 12/1987 | Schomblond .............. 425/120 |
| 4,731,014 | A | * | 3/1988 | Von Holdt .................. 425/556 |
| 4,732,558 | A | * | 3/1988 | Grannen, III .............. 425/570 |
| 4,777,004 | A | * | 10/1988 | Galer ......................... 264/320 |
| 5,071,335 | A | * | 12/1991 | Riedel et al. ............... 425/130 |
| 5,094,602 | A | * | 3/1992 | Morita ....................... 425/130 |
| 5,171,585 | A | * | 12/1992 | Onisawa et al. ......... 425/192 R |
| 5,183,615 | A | * | 2/1993 | Zushi ......................... 264/219 |
| 5,200,209 | A | * | 4/1993 | Nattel et al. ............... 425/577 |
| 5,217,732 | A | * | 6/1993 | Rudolf et al. .............. 425/572 |
| 5,229,905 | A | * | 7/1993 | Morita ....................... 360/132 |
| 5,240,402 | A | * | 8/1993 | Ingram ....................... 425/522 |
| 5,240,719 | A | * | 8/1993 | Hedgewick ................ 425/556 |
| 5,281,385 | A | * | 1/1994 | Julian ......................... 264/318 |
| 5,372,491 | A | * | 12/1994 | Fritsch et al. .............. 425/130 |
| 5,527,173 | A | * | 6/1996 | Miller et al. ............. 425/126.1 |
| 5,656,234 | A | * | 8/1997 | Kaneishi et al. ............ 264/572 |
| 5,695,790 | A | * | 12/1997 | Lin ............................. 425/190 |
| 5,728,410 | A | * | 3/1998 | Hendry ....................... 425/130 |
| 5,759,464 | A | * | 6/1998 | Matsumoto et al. ........ 264/138 |
| 5,798,127 | A | * | 8/1998 | Thayer et al. .............. 425/117 |
| 5,798,129 | A | * | 8/1998 | Megleo ...................... 425/215 |
| 5,865,241 | A | * | 2/1999 | Bishenden et al. .......... 164/137 |
| 5,948,446 | A | * | 9/1999 | Hori ........................... 425/130 |
| 6,123,889 | A | * | 9/2000 | Katagiri et al. ............. 264/255 |
| 6,143,237 | A | * | 11/2000 | Eckardt et al. .............. 264/572 |
| 6,294,123 | B1 | * | 9/2001 | Kitayama et al. ........ 264/328.9 |
| 6,338,289 | B1 | * | 1/2002 | Lee .......................... 74/606 R |
| 6,358,446 | B1 | * | 3/2002 | Clarke .......................... 264/50 |
| 6,383,442 | B1 | * | 5/2002 | Palmers ...................... 264/572 |
| 6,387,311 | B1 | * | 5/2002 | Lacour et al. ............... 264/229 |
| 6,416,315 | B1 | * | 7/2002 | Ciccone ...................... 425/556 |
| 6,443,723 | B1 | * | 9/2002 | Buttigieg .................... 425/214 |
| 6,521,165 | B2 | * | 2/2003 | Rick ........................... 264/334 |
| 6,607,296 | B2 | * | 8/2003 | Yoshinaga et al. .......... 362/520 |
| 6,619,943 | B1 | * | 9/2003 | Sameshima et al. ......... 425/130 |
| 6,719,938 | B2 | * | 4/2004 | Summerer .................. 264/241 |
| 6,939,504 | B2 | * | 9/2005 | Homann et al. ............. 264/572 |
| 7,104,774 | B2 | * | 9/2006 | Buttigieg .................... 425/190 |
| 7,104,781 | B2 | * | 9/2006 | Iwata et al. ................. 425/542 |
| 7,153,125 | B2 | * | 12/2006 | Evans et al. ................. 425/392 |
| 7,381,051 | B2 | * | 6/2008 | Wang et al. ................. 425/577 |
| 2001/0015341 | A1 | * | 8/2001 | Higgins ...................... 215/252 |
| 2001/0050450 | A1 | * | 12/2001 | Kayano et al. .............. 264/513 |
| 2002/0167816 | A1 | * | 11/2002 | Yoshinaga et al. .......... 362/520 |
| 2002/0197428 | A1 | * | 12/2002 | Evans et al. ................. 428/35.7 |
| 2003/0116886 | A1 | * | 6/2003 | Nakazawa ................... 264/255 |
| 2003/0205915 | A1 | | 11/2003 | Gedritis et al. |
| 2003/0214071 | A1 | * | 11/2003 | Ogawa et al. ............... 264/255 |
| 2004/0115300 | A1 | * | 6/2004 | Zuffa .......................... 425/422 |
| 2004/0188894 | A1 | * | 9/2004 | Homann et al. ............. 264/572 |
| 2005/0208172 | A1 | * | 9/2005 | Buttigieg .................... 425/441 |
| 2007/0098935 | A1 | * | 5/2007 | Farran et al. ................ 428/35.7 |
| 2007/0264474 | A1 | * | 11/2007 | Filipp et al. ................. 428/174 |

FOREIGN PATENT DOCUMENTS

| | | | |
|---|---|---|---|
| EP | 1370075 | | 10/1974 |
| EP | 61/076333 | | 4/1986 |
| EP | 07/186186 | | 7/1995 |
| JP | 07016873 A | * | 1/1995 |
| JP | 7-186186 | | 7/1995 |

* cited by examiner

MOULD FOR THE INJECTION MOULDING OF A PLASTIC PIECE AND MOULDING METHOD

BACKGROUND OF THE INVENTION

This invention relates to the injection moulding of a plastics part comprising at least two adjacent parts comprising two plastics materials of different kinds and/or colours.

DESCRIPTION OF THE RELATED ART

Some plastics parts, and in particular parts for the interior trim of motor vehicles, comprise several adjacent parts of different colours or appearances. These parts are obtained for example by injection moulding parts in a mould in which surface skins of different colours or textures have already been placed. Such a process has the disadvantage that it requires several operations and in particular the preparation of surface skins corresponding to parts of different kinds and/or colours.

In order to manufacture such parts moulds in which the mould cavity can be subdivided into several parts through the use of a moving wall or moving blade which can be retracted may also be used. In such moulds the moving wall is first located in an extended position so that it divides the mould cavity into two parts, and a first plastics material is injected into a first part of the mould cavity. After the injected plastics material has solidified the moving wall is moved into a retracted position which places the second part of the mould cavity in communication with the part which has already been filled with plastics material by injection. The second plastics material is then injected into the second part of the mould cavity. This second plastics material comes into contact with the already solidified plastics material and adheres to this first plastics material through welding. This technique has a disadvantage in that it is only suitable for parts which have flat walls. In fact, in order to ensure a satisfactory seal for the two parts of the mould cavity bounded by the moving wall it is necessary to use a moving wall which has one edge in close contact with a surface of the mould cavity in the extended position and which perfectly matches the second surface of the mould cavity in the retracted position. This arrangement in particular requires that the mould cavity should be planar, at least in the area of contact with the edge of the moving wall. This constraint constitutes a limitation and a disadvantage because it is often desirable to manufacture parts of plastics material comprising several adjacent parts of different kinds and/or colours having non-planar surfaces.

SUMMARY OF THE INVENTION

The object of this invention is to overcome this disadvantage by providing means for injection moulding a part of plastics material comprising at least two adjacent parts made of two plastics materials of different kinds and/or colours in order to manufacture a part having non-planar walls.

For this purpose the invention relates to a mould for injection moulding a part of plastics material comprising at least two adjacent parts constituting two plastics materials of different kinds and/or colours which are compatible and assembled together by welding or adhesive bonding, the mould comprising a mould cavity bounded by at least two non-planar walls and at least one moving wall which can be retracted from an extended position to a retracted position, through which the mould cavity can be divided into at least two compartments which can be fed with plastics material separately. In the extended position the retractable wall has a non-linear edge which acts together with a wall of the mould cavity without any play, and the retractable wall comprises a plurality of panels which are contiguous in at least the extended position or the retracted position, the said panels being able to move with respect to each other in such a way that they can change the shape of the non-linear edge of the retractable wall in order to adjust it to the shape of a second cavity wall in the retracted position.

Preferably the retractable wall comprises at least three non-co-linear portions and the retractable wall comprises at least one panel which can be moved between the extended position and the retracted position in two successive movements in two different directions.

The edge of the retractable wall comprises for example a central portion in the form of a segment which is extended at its two extremities by terminal arcs which are not co-linear with the central segment, and in the extended position the retractable wall has two lateral panels separated by a central retractable panel, the lateral panels being able to move in two perpendicular directions in such a way that they can be moved into a retracted position by two successive movements in two different directions.

The mould may comprise a plurality of retractable walls.

The invention also relates to a process for manufacturing a part of plastics material comprising at least two adjacent parts formed of plastics materials of different kinds and/or colours by moulding in a mould according to the invention. According to the invention:

at least one retractable wall of the mould can be placed in an extended position in such a way as to bound at least two adjacent moulding compartments, at least one first compartment can be filled with a first plastics material and allowed to cool, through successive movements of the panels of at least one retractable wall the said wall can be retracted in order to move it into a retracted position, at least one second compartment adjacent to the said first compartment can be filled with a second plastics material, allowed to cool and turned out.

Finally the invention relates to a part of plastics material of non-planar shape comprising at least two adjacent parts comprising plastics materials of different kinds and/or colours and having a junction zone bounded by two lines which are not straight in projection in a transverse cross-sectional plane and which are not derived from each other by translational movement, the said part being obtained by the process according to the invention.

The part of plastics material comprises for example an element of the interior trim of a motor vehicle.

BRIEF DESCRIPTION OF THE DRAWINGS

Other advantages and characteristics of the present invention will become clear from the following detailed description which is given with reference to the appended drawings which are provided purely by way of non-limiting example and in which.

DETAILED DESCRIPTION OF THE PREFERRED EMBODIMENTS

Figure 1A:
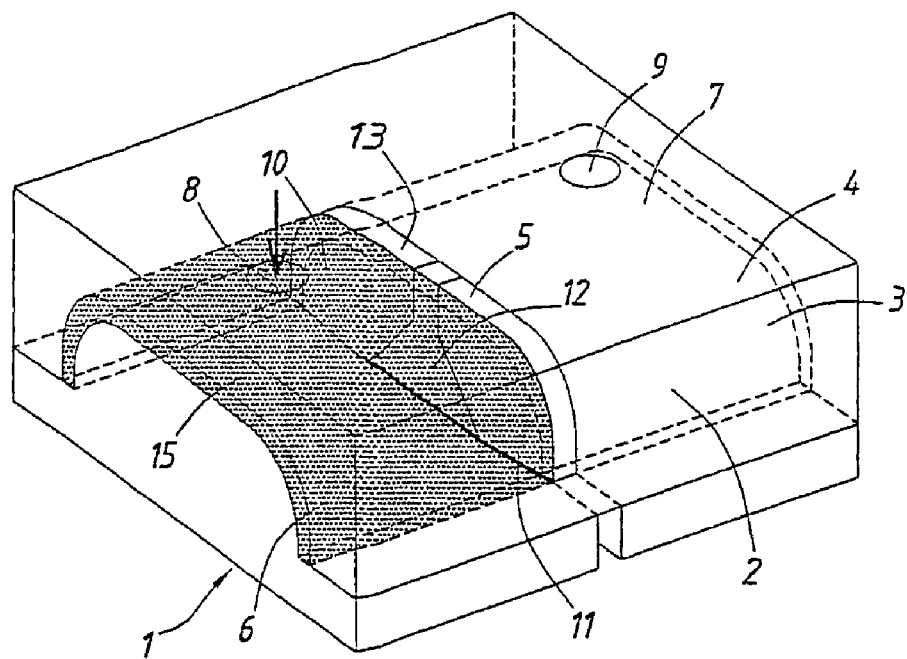
FIGS. 1A, B, C, D are perspective view of a mould for the injection moulding of a part of plastics material comprising at least two adjacent parts of different kinds and/or colours, the mould comprising a retractable wall comprising a plurality of movable panels; the retractable wall is illustrated in different positions.

The mould referred to in general by 1 in FIG. 1A comprises a mould cavity 2 bounded by a non-planar bottom wall 3 and a non-planar top wall 4 which are generally parallel to each other.

Mould cavity 2 is divided by a retractable wall 5 into a first mould compartment 6 and a second mould compartment 7 each fed through an injection hole, 8 for compartment 6 and 9 for mould compartment 7.

Figure 2A:
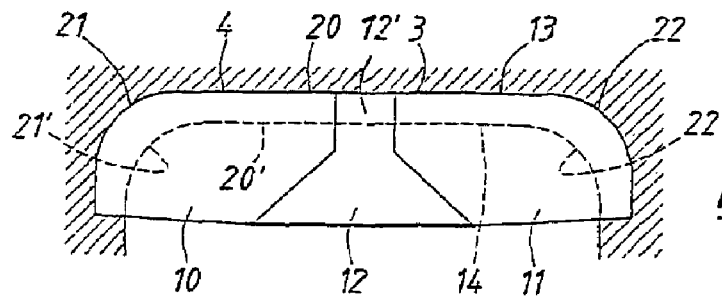
FIGS. 2A, 2B, 2C and 2D are cross-sectional views of the mould in FIGS. 1A, B, C and D cut by a plane passing through the movable wall of the mould.

In the extended position as illustrated in FIG. 1A or FIG. 2A retractable wall 5 comprises three adjacent panels: 2 extremity panels 10 and 11 separated by a central panel 12. The three adjacent panels 10, 11 and 12 define a top edge 13 which comes into contact with top wall 4 of the mould. In this arrangement the two mould compartments 6 and 7 are completely separated. The plastics material can then be injected through a first injection hole 8, for example, as illustrated by the arrow shown in FIG. 1A, to form a first part 15 of a part of plastics material.

Figure 1B:
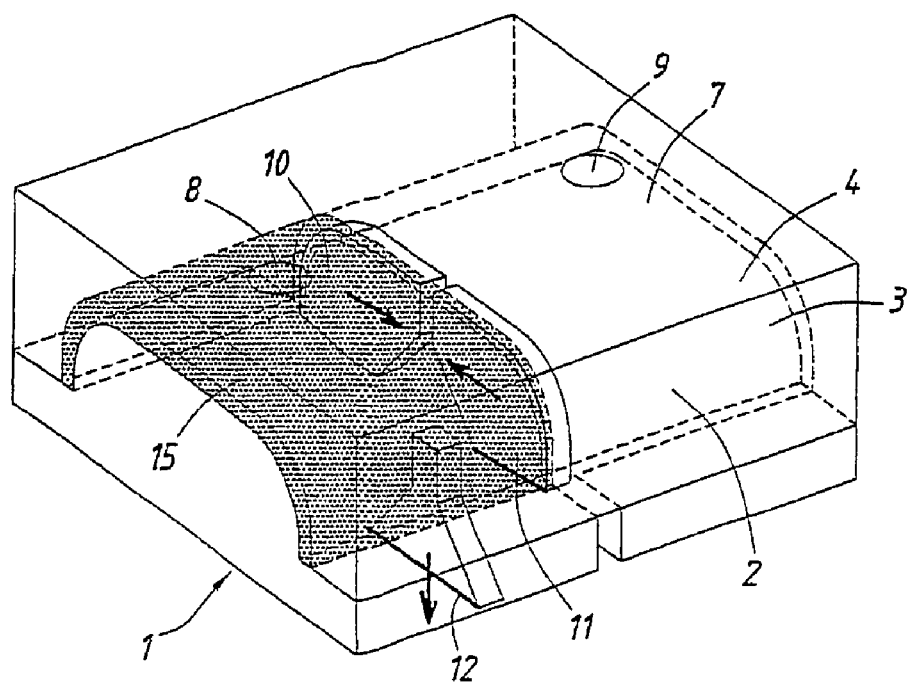
Figure 2B:
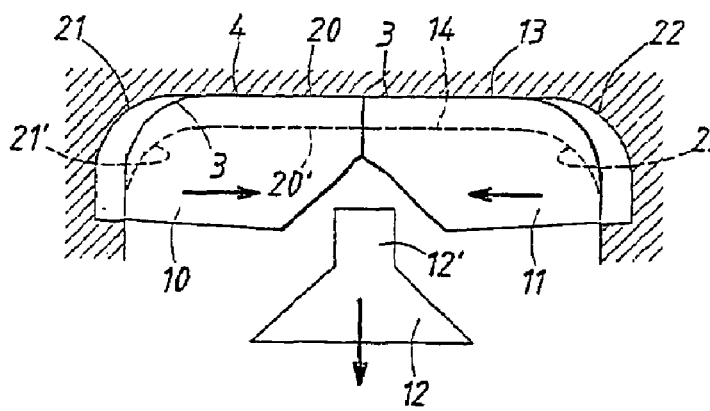

As illustrated in FIG. 1B or FIG. 2B, central panel 12 of retractable wall 15 can be moved downwards as indicated by the vertical arrow, which releases a space between lateral panels 10 and 11 and makes it possible for them to move laterally in the direction of the two horizontal arrows illustrated in FIG. 1B or 2B in order to approach each other.

Figure 1C:
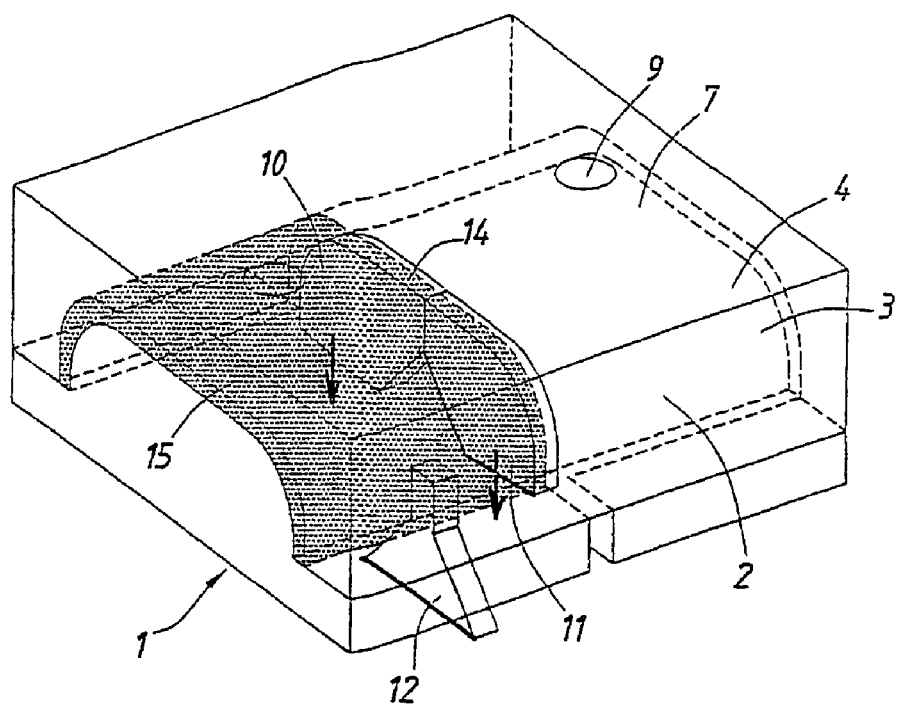
Figure 1D:
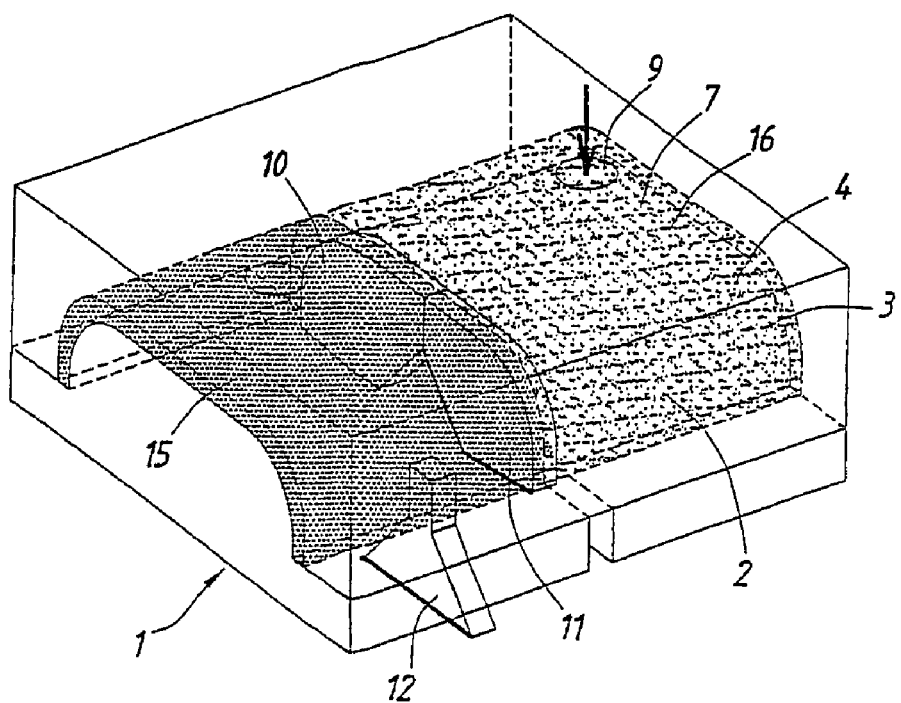
Figure 2C:
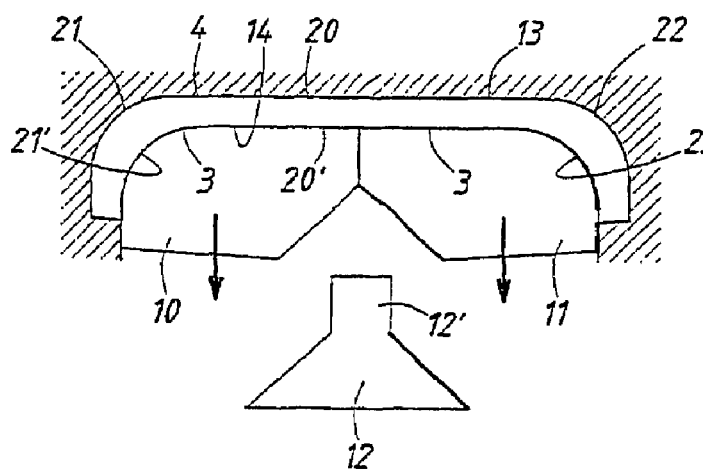
Figure 2D:
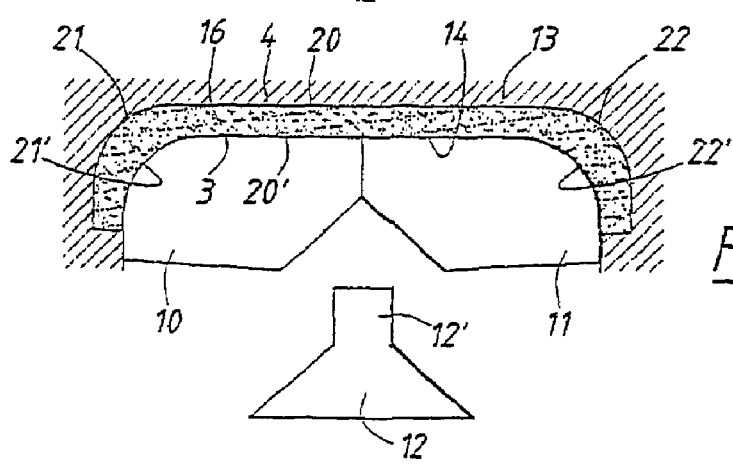

Central moving panel 12 has a top part 12' of a width equal to twice the thickness of mould cavity 2 in its lateral extremity parts, although once central panel 12 is retracted and lateral panels 10 and 11 are brought together to come into contact with each other in the central part, set of panels 10 and 11 can be moved vertically as shown in FIGS. 1C and 2C by a movement in the direction of the two vertical arrows. Following this movement, and as shown in FIG. 1D or 2D, lateral panels 10 and 11 then form a retracted wall whose top edge 14 exactly matches the shape of non-planar bottom wall 3 of mould cavity 2. In this arrangement which corresponds to the retracted position of retractable wall 5, upper edge 14 of the retractable wall in the retracted position completes non-planar bottom wall 3 of the mould.

When the retractable wall is retracted second mould compartment 7 is bounded by the two non-planar walls 3 and 4 of the mould, top edge 14 of the retractable wall in the retracted position and by the first part 15 of the part present in first compartment 6 into which plastics material has already been injected. A second plastics material of a different colour or kind from the first plastics material can then be injected through second injection hole 9 to form the second part of the part of plastics material comprising two parts of different colours or kinds. This second part 16 is welded onto first part 15 of the part.

Figure 3:
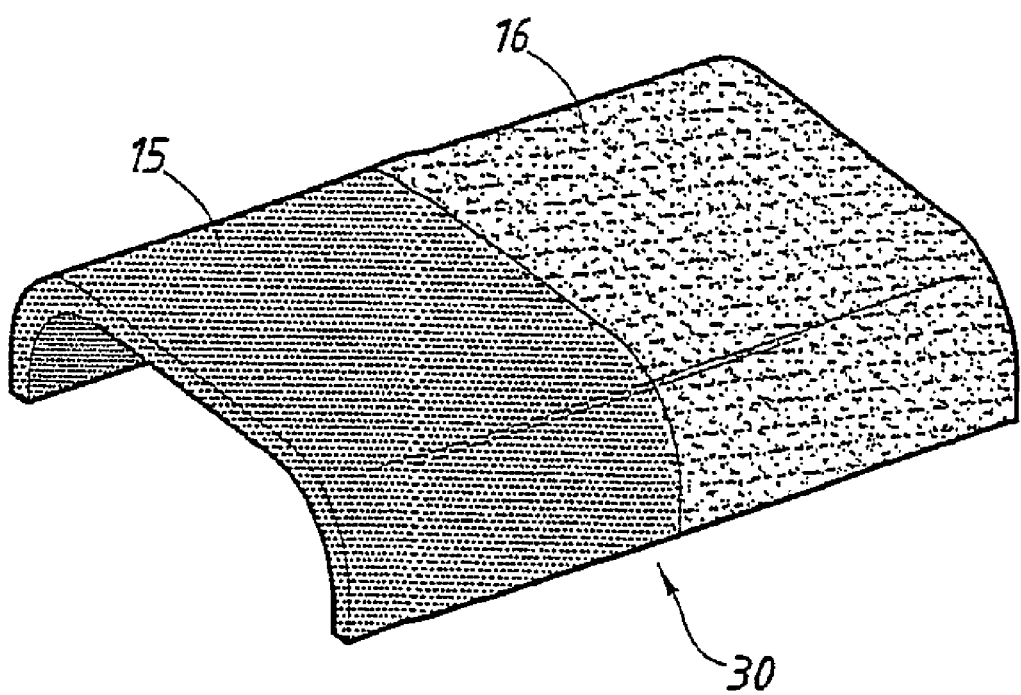
FIG. 3 is a perspective view of a part obtained by moulding using the mould illustrated in FIGS. 1A, B, C and D.

In order to manufacture a part 30 of plastics material comprising two parts of different kinds or colours having non-planar surfaces as illustrated in FIG. 3, a start is made by separating mould cavity 2 into two mould compartments 6 and 7 by positioning retractable wall 5 in the extended position. In this extended position retractable wall 5 comprises three adjacent panels and its top edge 13 is in contact with non-planar top wall 4 of mould cavity 2. A first plastics material is then injected into first compartment 6 through first injection hole 8, and then the plastics material which has been injected is allowed to cool or solidify to form the first part 15 of the part of plastics material. Wall 5 is then retracted by moving it into a retracted position in which its top edge 14 completes non-planar bottom wall 3 of wall cavity 2. In order to do this the shape of the top edge of the retractable wall is changed, starting with retracting central panel 12, as a result of which the two lateral panels 10 and 11 can approach each other through a first horizontal movement, and then moving these two panels downwards in a second vertical movement. Through these operations a top edge 14 of the retractable wall is obtained which is both continuous and perfectly matches non-planar bottom wall 3 of mould cavity 2. In this arrangement second mould cavity 7 is bounded at one of these extremities by the first part 15 of the part of plastics material. A second plastics material which is selected in such a way as to be compatible with and weldable to the plastics material of the first part, but which may have different properties because special additives have been added to it, or which may be of a different colour, or which may be both of a different colour and have different additives, is then injected through second injection hole 9. This plastics material injected into the second compartment forms the second part 16 of the part of plastics material. Once this second plastics material has been completely injected into second mould compartment 7 the whole is allowed to cool, and then the part is turned out and a part comprising two adjacent parts of plastics materials of different colours and/or kinds is obtained.

Advantageously the cooling or solidification of the first injected plastics material is partial so that the first material remains essentially sufficiently ductile, so that when the second material is injected the two materials penetrate each other to a greater or lesser extent.

With an increasing level of cooling, welding, that is interpenetration of the two materials or bonding, that is to say surface adhesion between the two materials through surface fusion, takes place.

Another parameter bringing about welding or adhesion results from the materials used and their ductilities at the temperatures in question. By way of example PP is more fluid than ABS and at an equivalent temperature PP forms a weld whereas ABS forms an adhesive bond.

It will be noted that walls 3 and 4 of the first and second mould compartments may for example have different surface appearances in order to impart different polished or grained appearances to the two parts of the plastics part.

It will also be noted that top edge 13 of retractable wall 5 has three non-co-linear portions when that wall is in the extended position, these being a central segment 20 and two lateral terminal arcs 21 and 22 extending in directions perpendicular to central segment 20. Likewise bottom edge 14 of retractable wall 5 has three non-co-linear portions when in the retracted position, these being a central segment 20' and two lateral terminal arcs 21' and 22' which are not co-linear with central segment 20'. It will be noted in particular that segments 20 and 20' are parallel to each other, but segment 20' is shorter than segment 20, and that terminal arcs 21' and 22' can be derived from terminal arcs 21 and 22 by translational movements. As a result of these arrangements mould cavity 2 can be perfectly separated by a retractable wall 5 of variable geometry as described.

The mould which has just been described comprises two adjacent mould compartments capable of manufacturing a part comprising two adjacent parts of different kinds and/or colours. But it is obvious that a mould comprising more than two adjacent mould compartments separated one from the next by retractable walls can be envisaged. Thus parts of plastics material comprising more than two adjacent parts of different kinds and/or colours, and for example three adjacent parts, or four or even more parts, may thus be manufactured.

Likewise the shape of part 30 as illustrated in FIG. 3 is that of a part comprising a wall comprising a flat panel terminating in rounded lateral edges extending perpendicularly to the line joining the two parts of different kinds or colours. However it is possible to manufacture parts having different shapes and comprising for example several adjacent planar panels each orientated in a particular direction. Such a part comprising several planar panels which are not parallel to each other is a non-planar part which in order to be moulded in a mould comprising a mould cavity which can be separated into several compartments by at least one retractable wall also requires retractable walls comprising several panels moving with respect to each other which can be moved in such a way as to form walls having a first shape in an extended position and a different shape in a retracted position. Those skilled in the art will be able to define retractable walls comprising appropriate panels in order to bring about this necessary geometrical evolution between the extended positions and the retracted positions on an individual basis.

The process which has just been described can be used to manufacture a great variety of parts of plastics material comprising several adjacent parts comprising plastics materials which are compatible and assembled together by welding or adhesive bonding, but of different kinds and/or colours. These parts are for example parts of motor vehicle dashboards, or parts of the interior trim of motor vehicle doors, or any other interior or exterior motor vehicle parts of plastics material.

The process and the mould which have just been described are more particularly useful for manufacturing parts comprising at least two parts of different kinds or colours having non-planar surfaces and in which these two parts furthermore have a junction area bounded by lines on the top and bottom walls of the part which are not straight in orthogonal projection onto a transverse cross-sectional plane (the plane in FIG. 3), and which cannot be developed one from another through translational movement parallel to the plane of movement of the contiguous panels of the retractable wall of the mould. In particular such a non-straight (or non-linear) junction line may be at least partly curved or form a broken line in projection.

The transverse cross-sectional plane is a plane extending through the thickness of the part, at least partly containing the junction surface.

Such a part having a non-straight junction zone is illustrated in FIG. 3.

In orthogonal projection onto a plane perpendicular to the aforementioned transverse cross-sectional plane the junction area may have any shape provided that it is compatible with the movements of the retractable wall. Those skilled in the art will be able to determine these compatibility conditions.

The invention claimed is:

1. A mould for injection moulding a part of plastic material (30) comprising at least two adjacent parts (15, 16) comprising two compatible plastic materials assembled together by welding or adhesive bonding, of different kinds and/or colors, the mould (1) comprising:
   a mould cavity (2) bounded by at least a first and a second non-planar wall; and
   at least one retractable wall (5) configured to move between a retracted position and an extended position, the retractable wall dividing the mould cavity (2) into at least two separated compartments (6, 7) in the extended position, each of the two compartments configured to be separately fed with plastic material,
   wherein, in the extended position, the retractable wall (5) has a non-linear edge (13) that is in contact with the first wall (4) of the mould cavity along an entirety of the non-linear edge (13), and
   wherein the retractable wall comprises a plurality of panels (10, 11, 12) contiguous in at least one of the extended position and the retracted position, the panels (10, 11, 12) configured to move in relation to each other in such a way as to alter the non-linear edge of the retractable wall to match a shape of the second wall (3) of the mould cavity (2) when in the retracted position.

2. A mould according to claim 1, wherein the non-linear edge (13) of the retractable wall (5) comprises at least three non-linear portions (20, 21, 22, and
   wherein the retractable wall comprises at least one panel (10, 11) configured to move between the extended position and the retracted position by two successive movements in two different directions.

3. The mould according to claim 2,
   wherein the non-linear edge (13) of the retractable wall (5) comprises a central portion (20) having a form of a central segment, and terminal arcs (21, 22) at two extremities of the central portion, the terminal arcs (21, 22) not being co-linear with the central segment of the central portion (20), and
   wherein, in the extended position, the retractable wall comprises two lateral panels (10, 11) separated by a retractable central panel (12), the lateral panels (10, 11) configured to move in two perpendicular directions so as to be moved into a retracted position by two successive movements in two different directions.

4. The mould according to claim 1, wherein the mould cavity (2) is bounded by a plurality of retractable walls.

5. The mould according to claim 2, wherein the mould cavity (2) is bounded by a plurality of retractable walls.

6. The mould according to claim 3, wherein the mould cavity (2) is bounded by a plurality of retractable walls.

7. A mould for injection moulding a part of plastic material comprising at least two adjacent parts, the mould (1) comprising:
   a first non-planar wall;
   a second non-planar wall, connected to the first non-planar wall to form a mould cavity; and
   at least one retractable wall configured to move between an extended position and a retracted position,
   wherein the retractable wall, in the extended position, divides the mould cavity (2) into at least two separated compartments (6, 7), each of the two compartments configured to be separately fed with plastic material,
   wherein, in the extended position, an entirety of a non-linear edge (13) of the retractable wall (5) has a first shape configured to be in close contact with the first wall along an entirety of the non-linear edge (13), the non-linear edge (13) cooperating together with the first wall to divide the mould cavity (2) into the at least two separated compartments (6, 7), and
   wherein the retractable wall comprises a plurality of panels (10, 11, 12) contiguous in at least one of the extended position and the retracted position, the panels (10, 11, 12) configured to move in relation to each other to alter the nonlinear edge of the retractable wall, in the retracted position, to form a second shape matching a shape of the second wall.

\* \* \* \* \*